(12) United States Patent
Xu et al.

(10) Patent No.: US 10,860,260 B2
(45) Date of Patent: Dec. 8, 2020

(54) METHOD, APPARATUS AND COMPUTER PROGRAM PRODUCT FOR MANAGING STORAGE SYSTEM

(71) Applicant: EMC IP Holding Company LLC, Hopkinton, MA (US)

(72) Inventors: Tao Xu, Beijing (CN); Hongpo Gao, Beijing (CN); Jibing Dong, Beijing (CN); Shaoqin Gong, Beijing (CN); Baote Zhuo, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 16/249,161

(22) Filed: Jan. 16, 2019

(65) Prior Publication Data

US 2019/0220231 A1    Jul. 18, 2019

(30) Foreign Application Priority Data

Jan. 18, 2018  (CN) .......................... 2018 1 0049953

(51) Int. Cl.
*G06F 12/00* (2006.01)
*G06F 3/06* (2006.01)

(52) U.S. Cl.
CPC .......... *G06F 3/0689* (2013.01); *G06F 3/0604* (2013.01); *G06F 3/0647* (2013.01)

(58) Field of Classification Search
CPC .... G06F 3/0689; G06F 3/0604; G06F 3/0647; G06F 3/061; G06F 3/0614; G06F 3/0646; G06F 3/0683
See application file for complete search history.

(56) References Cited

U.S. PATENT DOCUMENTS

| | | | |
|---|---|---|---|
| 5,974,503 A | 10/1999 | Venkatesh et al. | |
| 10,209,904 B2 | 2/2019 | Himelstein et al. | |
| 10,481,802 B1 | 11/2019 | Gao et al. | |
| 10,540,103 B1 | 1/2020 | Gao et al. | |
| 10,592,138 B1 | 3/2020 | Han et al. | |
| 10,691,354 B1 | 6/2020 | Kucherov | |
| 2002/0191311 A1* | 12/2002 | Ulrich | G06F 16/10 360/1 |

* cited by examiner

*Primary Examiner* — Shawn X Gu
(74) *Attorney, Agent, or Firm* — BainwoodHuang

(57) ABSTRACT

Techniques manage a storage system. The techniques involve: in response to determining that a rebalance operation is to be performed, determining a source storage device and a destination storage device associated with the rebalance operation based on distribution information of segments included in stripes of the storage system across a plurality of storage devices in the storage system. The techniques further involve: determining a target segment from the source storage device, based on access information of segments in the source storage device. The techniques further involve: moving the target segment to the destination storage device. Accordingly, the rebalance operation can be performed more efficiently, and the overall performance of the storage system can be optimized.

20 Claims, 7 Drawing Sheets

METHOD, APPARATUS AND COMPUTER PROGRAM PRODUCT FOR MANAGING STORAGE SYSTEM

FIELD

Embodiments of the present disclosure relate to the field of data storage, and more specifically to a method, an apparatus, and a computer program product for managing a plurality of storage systems.

BACKGROUND

In recent years, storage systems based on Redundant Arrays of Independent Disks (RAID) have made great progress. A RAID-based technology is a data storage virtualization technology. According to the virtualization technology, one or more storage systems serving as RAID may be built on a plurality of physical storage devices (e.g., disks), to provide many kinds of properties such as data redundancy and performance enhancement. The RAID performs data write/read with a stripe as a unit. Traditionally, data is evenly written in disks in the level of disks. Specifically, when data is written, data of each stripe of the RAID is evenly written into a plurality of disks that are used for establishing the system, so that the overall data of the RAID is evenly distributed on the plurality of disks. Such system might have defects in many aspects such as disk management and data read/write.

As the RAID technology develops, a new RAID technology has already been proposed. The RAID performs data read/write on disk segment levels not on disk levels. According to such technology, a plurality of disks are divided into a plurality of segments. A certain number of segments are allocated to each stripe of the RAID established based on these disks, and segments included in all stripes of the RAID are substantially evenly distributed on the plurality of disks. Such RAID may also be called a Mapped RAID or Distributed RAID.

However, although the RAID technology develops constantly, a more optimized disk management scheme is still needed in the Mapped RAID. For example, on an occasion of adding new disks to the RAID, a rebalance operation will be performed in the current disk management scheme, so as to achieve a state of even distribution (or substantially even distribution) of all segments in RAID on all disks. The current rebalance operation, when being executed, considers only physical evenness of the distribution of the segments, results in some drawbacks in overall performance of the storage system, after undergoing the rebalance operation.

SUMMARY

Embodiments of the present disclosure provide a scheme of an improved management storage system.

In a first aspect of the present disclosure, there is provided a method of managing a storage system. The method includes: in response to determining that a rebalance operation is to be performed, determining a source storage device and a destination storage device associated with the rebalance operation based on distribution information of segments included in stripes of the storage system across a plurality of storage devices in the storage system. The method further includes: determining a target segment from the source storage device, based on access information of segments in the source storage device. The method further includes: moving the target segment to the destination storage device.

In a second aspect of the present disclosure, there is provided an apparatus for managing a storage system. The apparatus includes one or more processors, a memory coupled to at least one of the one or more processors, and computer program instructions stored in the memory which, when executed by the at least one processor, cause the apparatus to perform acts of managing a plurality of storage devices. The acts include: in response to determining that a rebalance operation is to be performed, determining a source storage device and a destination storage device associated with the rebalance operation based on distribution information of segments included in stripes of the storage system across a plurality of storage devices in the storage system. The acts further include: determining a target segment from the source storage device, based on access information of segments in the source storage device. The acts further include: moving the target segment to the destination storage device.

In a third aspect of the present disclosure, there is provided a computer program product. The computer program product being tangibly stored on a non-transitory computer-readable medium and including machine-executable instructions which, when executed, cause the machine to perform the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the more detailed description of embodiments of the present disclosure in combination of the drawings, the above and other objects, features and advantages of the present disclosure will become more apparent, wherein like reference generally refers to like components in the embodiments of the present disclosure.

DETAILED DESCRIPTION

Figure 1:
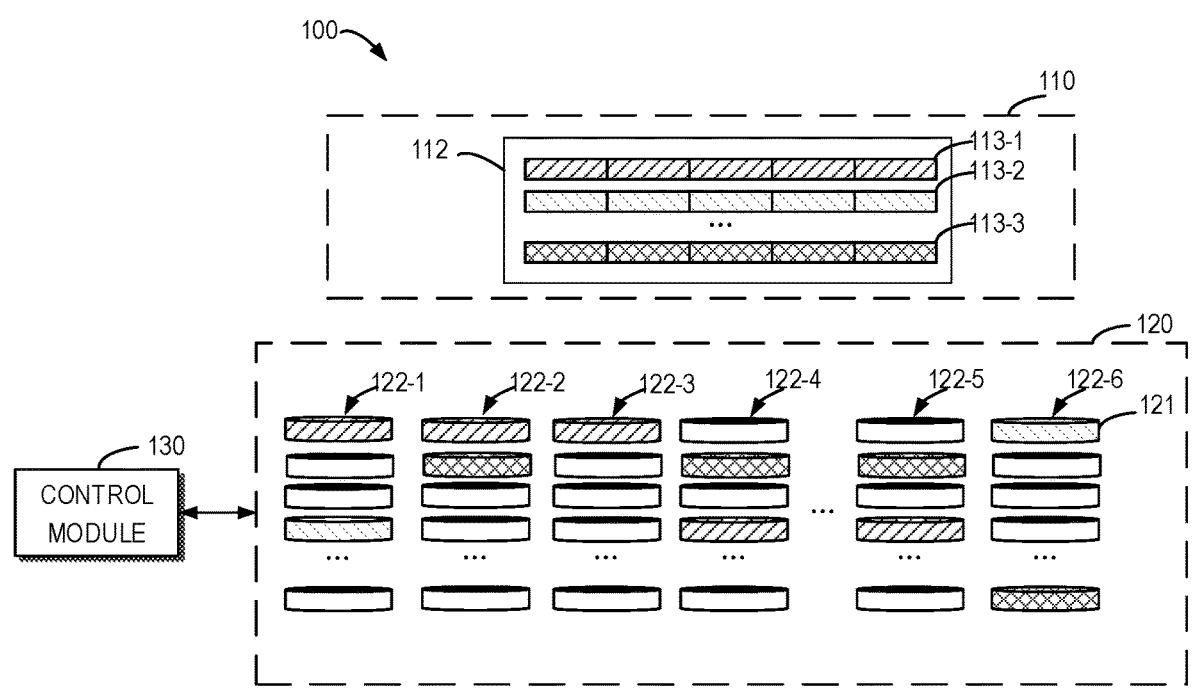
FIG. 1 illustrates a schematic diagram of a storage management system in which an embodiment of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to various example embodiments illustrated in the drawings. Although figures show some preferred embodiments of the present disclosure, it should be appreciated that these embodiments are described only to enable those skilled in the art to better understand and further implement the present disclosure, not intended for limiting the scope of the present disclosure in any manner.

As used herein, the term "includes" and its variants are to be read as open terms that mean "includes, but is not limited to." Unless otherwise specified, the term "or" represents "or/and". The term "based on" is to be read as "based at least in part on." The term "one implementation" and "an implementation" are to be read as "at least one implementation." The term "another implementation" is to be read as "at least one other implementation." Terms such as "first" and "second" may refer to different or identical objects. The text below might include other explicit and implicit definitions.

FIG. 1 illustrates a schematic diagram of a storage management system 100 in which an embodiment of the present disclosure may be implemented. The storage management system 100 includes a Redundant Arrays of Independent Disks (RAID) virtualization layer 110 and a physical storage layer 120. In the present disclosure, "Redundant Arrays of Independent Disks" may also be collectively called "storage system", which will not be limiting herein. The physical storage layer 120 includes a plurality of physical disks 122-1, 122-2, . . . 122-5, 122-6 that serve as storage devices (e.g., N+1 storage devices, from disk 0 to disk N), and are used to provide a physical storage space. In the description hereunder, these disks may be collectively called or separately called as "storage device" or "disk" 122, which is not limited by the present disclosure herein. Disk 122 may be various non-volatile disks and its examples may include but not limited to digital versatile disc (DVD), Blu-ray Dis (BD), Compact Disk (CD), floppy disk, hard disk, tape drive, optical drive, and Solid-state Disk (SSD). Other disks that can provide a storage space may also be used. Each disk 122 is divided into a plurality of segments 121. Each of the plurality of segments 121 may has the same storage capacity. Sometimes, the segments 121 may also called disk extents, storage units and so on. The layer 120 may also be called a storage pool or disk pool. In some cases, one or more new disks may also be added into the layer 120, to extend the storage capacity.

The RAID virtualization layer 110 may include one or more RAID groups 112. In FIG. 1, for the sake of brevity, only one RAID group is shown. These RAID groups may be collectively called or separately called as RAID 112. Each RAID 112 is built on a plurality of segments 121 obtained by dividing the plurality of disks 122 of the physical storage layer 120. Sometimes such RAID 112 is also called Mapped RAID or Distributed RAID. The RAID 112 may include a plurality of stripes 113 (also called RAID extent or RAID slice), and each stripe 113 is respectively mapped to one or more segments 121 of the layer 120. The number of segments 121 included in each stripe 113 may indicate a stripe width, and may also be called RAID width. When a user writes data into a certain stripe 113 of the RAID 112, the written data is stored into segments 121 to which the stripe 113 is mapped.

Depending on properties such as redundancy and performance, the RAID 112 may have different organization manners and levels. RAID 112 at different levels distribute data on the segments 121 to which the stripe 113 is mapped, in different manners. According to rules of mapping RAID, each stripe in the RAID virtualization layer is mapped to a plurality of segments included in several disks selected from the plurality of disks in the physical storage layer. The levels of RAID for example may include RAID 1, RAID 2, . . . , and RAID 5. Take RAID 112 at the level of RAID 5 (also called 4D+1P), each stripe 113 therein includes five segments 121, wherein four segments 121 may include data (D), and the remaining one segment 121 may contain parity information (P). The segment 121 containing the parity information for example may be used to restore data of the segments 121 in the stripe 113 when the disk where segments of the stripe malfunctions. It should be appreciated that RAID at any other levels may be implemented in the storage management system 100.

According to the properties of RAID technology, each RAID 112 are evenly distributed on a plurality of available disks 122, namely, a plurality of stripes of each RAID 112 are evenly allocated with segments 121 of the available disks 122 in the layer 120. In the example shown in FIG. 1, stripes 113-1, 113-2, . . . 113-3 of the RAID 112 may be mapped to a plurality of segments 121 of disks 122-1, 122-2, . . . 122-6. For example, as shown in FIG. 1, stripe 113-1 of the RAID 112 is mapped to one segment 121 of the disk 122-1, one segment 121 of the disk 122-2, one segment of disk 122-3, one segment 121 of disk 122-4, and one segment 121 of the disk 122-5 respectively. Another stripe 113-2 is mapped to one segment 121 of the disk 122-1 and one segment 121 of disk 122-6 (the remaining three segments are not shown in FIG. 1). Regarding the stripe 113-3, it is mapped to one segment 121 of the disk 122-2, one segment of the disk 122-4 and one segment 121 of the disk 122-5 (the remaining two segments are not shown in FIG. 1). Other stripes may also be mapped in a similar manner. The number of segments 121 to which the RAID 112 is mapped on each available disk 122 is substantially the same, thereby implementing even distribution of the plurality of disks.

The storage management system 100 further includes a control module 130 for controlling the plurality of disks 122 of the layer 120. The control module 130 may be implemented by a device with processing capability, for example, a processor, a controller, a microcontroller, or a computer including the aforesaid components. The control module 130 may respond to a read/write request of the stripe 113 of the RAID layer 120, to read data from a corresponding segment 121 and/or write data into a corresponding segment 121. An operation involving read and/or write of data is called an input/output (I/O) operation. The control module 130 may further perform various maintenance operations for the plurality of disks 122, to support data redundancy, reliability and performances in other aspects of the storage management system 100. An operation involving maintenance of the plurality of disks 122 is called a background operation. The background operation involving distribution of segments in the control module 130 will be described below.

In some cases (e.g., when the current available RAID storage space is low), one or more new disks need to be added to the layer 120. At this time, the control module 130 will perform a segment re-distribution operation. The control module 130 re-allocates the segments of the new disk and segments of existing disks in the layer 120, so that all stripes 113 of the RAID 112 are evenly distributed in the segments of these disks. In the above process, some segments of the new disk will, in place of some segments in existing disks 122, be distributed to one or more stripes 113 of the RAID 112, that is, some segments in the existing disks 122 will be moved to the newly-distributed disk, until a new distribution balance state is achieved. Such re-distribution operation is also called rebalance, sometimes called "mixed writing" operation or "shuffling" operation. Through the above shuffling operation, mapping related to one or more stripes 113 of the RAID 112 will be updated according to the redistribution result.

It should be appreciated that the device and/or arrangement shown in FIG. 1 is only an example. In other examples, the storage management system 100 may further include any suitable number of disks 122 and the RAID built thereon. The type of the built RAID may be the same or different. Furthermore, the layer 120 may further include disks not used by any RAID or one or more disks serving as backup.

There are a number of problems in the segment distribution manner in a traditional scheme.

Figure 2:
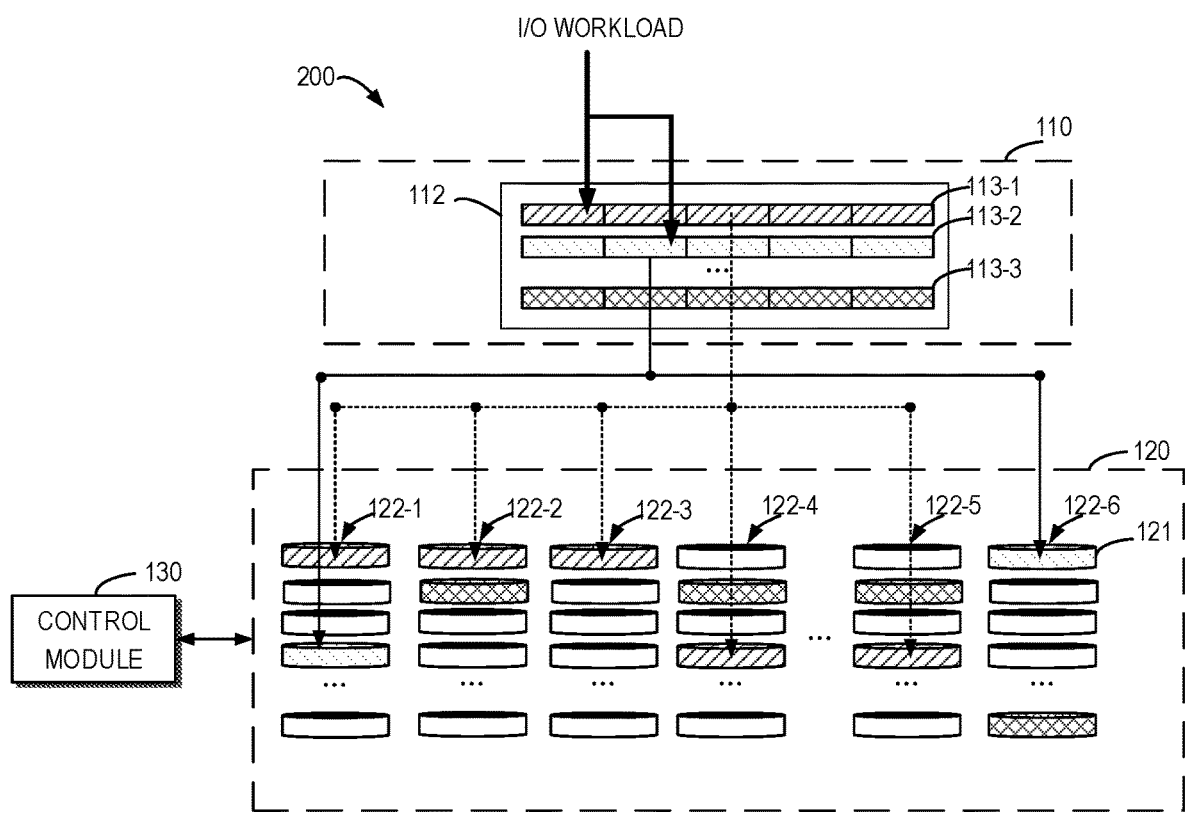
FIG. 2 illustrates a schematic diagram of a storage management system performing I/O processing according to an embodiment of the present disclosure.

For example, reference is made to the case shown in FIG. 2. FIG. 2 illustrates a schematic diagram of a storage management system performing I/O processing according to an embodiment of the present disclosure. In FIG. 2, an I/O load request from the external is received at layer 110. The load request involves performing an I/O operation with respect to the stripe 113-1 and stripe 113-2 simultaneously in the layer 110. That is, the operation needs to simultaneously perform I/O operation for five segments corresponding to the stripe 113-1, as well as five segments corresponding to the stripe 113-2. As shown in FIG. 2, for the current RAID, even though the segments corresponding to respective stripes achieve even distribution (or substantially even distribution) across disks of the physical storage layer 120, in the above example I/O operation mode there might be different I/O access heat to disks in the physical storage layer 120. For example, in FIG. 2, regarding the current external I/O request, the control module selects two segments in the disk 122-1 to perform the I/O operation. Regarding the remaining disks 122-2 to 122-6, only one segment is selected to perform I/O operation as shown in the figure.

It can be seen that regarding the disks in the layer 120, the I/O access heat may not be even. Although on disks in the layer 120, a plurality of segments corresponding to all stripes of the RAID realize even distribution physically, this does not certainly cause even distribution of I/O access to each disk. In fact, due to randomness of I/O access and RAID segment, at some instants, there might be disks with higher access heat in the layer 120, and there might be more I/O access times than other disks concentrate on this disk. This will cause a performance bottleneck and cause an influence on the overall performance of the RAID.

In the prior art, when rebalance operation (e.g., when a new disk is added to RAID) of segments needs to be performed, consideration are only taken into movement of segments to make all segments achieves even distribution across each disk of the layer 120, not to information of I/O access heat across each disk. How to realize physically even distribution as well as reduction of the current I/O access heat becomes a challenge.

In addition, when the current RAID performs the segment rebalance operation, there may further be a problem that excessive stripes might exist on a certain disk. For example, when old disks are about to be filled up with data and after a new disk is added to RAID, new RAID stripes will be distributed and created mainly on the new disk, which results in overlap of multiple stripes, that is, a specific disk accommodates a larger number of stripes than other disks, which also affects the overall I/O performance of the system.

In view of the above problems and other potential problems, an embodiment of the present disclosure provides an improved scheme of managing a plurality of disks. In the solution of the embodiment of the present disclosure, distribution information and access information associated with RAID are taken into consideration when the rebalance operation is performed for the segments. By considering the distribution information and access information when the rebalance operation is performed for the segments, the overlapping problem can be overcome as far as possible when the rebalance operation is performed for the segments, and the segments with a high access amount can be distributed as far as possible across different disks, thereby effectively avoiding the I/O bottleneck and implementing more flexible and more efficient dynamic management for the RAID while performing balance operation for segments in the RAID.

Embodiments of the present disclosure will be described in detail with reference to figures.

Figure 3:
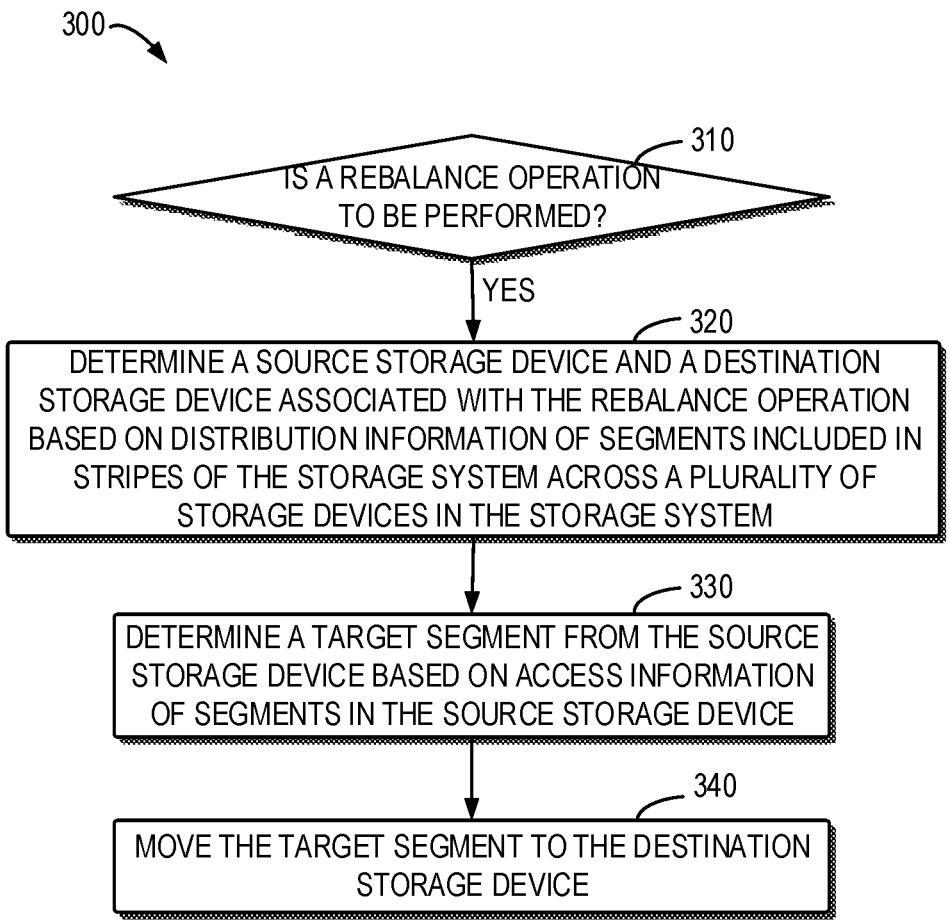
FIG. 3 illustrates a flow chart of a process of managing a plurality of storage devices according to an embodiment of the present disclosure.

FIG. 3 illustrates a flow chart of a process of managing a plurality of storage devices according to an embodiment of the present disclosure. The process 300 may be implemented at the control module 130 of FIG. 1. For the purpose of discussion, reference is made to FIG. 1 to describe the process 300.

At block 310, the control module 130 in the storage management system determines (or ascertains) whether the rebalance operation needs to be performed. The rebalance operation is usually activated in the case that the control module 130 determines that uneven distribution of segments exists in the current RAID. The control module 130 may, based on several judgment criteria, determine whether the rebalance operation needs to be performed currently. The judgment criteria may be based on distribution information of internal segments corresponding to each disk in the layer 120. For example, by obtaining information of the number of segments of each disk, it is possible to activate the rebalance operation based on whether the number of distributed segments in each disk is even (or substantially even). Determination of whether the distribution state of the segments is even may be performed based on common statistics criteria in the art. This is not specifically limited in the present disclosure herein.

The control module 130 further determines whether to stop performing the rebalance operation based on similar judgment criteria. For example, if the control module 130 judges that the number of distributed segments of each disk currently has reached a balanced (or substantially balanced) state, the rebalance operation for the segments in the RAID is stopped.

In response to the control module 130 determines that the current RAID needs to perform the rebalance operation, the process 300 proceeds to block 320.

At block 320, a source disk and a destination disk associated with the rebalance operation are determined (or identified) based on distribution information of segments included in the stripes of the storage system across a plurality of storage devices (namely, disks 122) in the storage system (namely, RAID 112). Referring to FIG. 1, segments included in each stripe of the plurality of stripes 113 in RAID 112 are distributed in a set of several disks selected from the plurality of disks in the layer 120. Specific disks in the layer 120 may include several allocated segments, several non-allocated segments, and several segments (not shown in FIG. 1) serving as hot backup.

The control module may obtain information associated with the distribution state of segments in each disk in the RAID 112. For example, the control module may obtain information indicating the number of stripes corresponding to all allocated segments in the disk, and the information is usually associated with the aforesaid problem of stripe overlapping. Hereunder, for ease of description, the foregoing information indicating the number of stripes corresponding to all allocated segments in the disk is called "a collision value". That is, it is possible to obtain the collision value of each disk, obtain the number of stripes in each disk, thereby reflect the stripe overlapping situations of each disk. It is easily appreciated that the disks with serious stripe overlapping situation usually cause reduction of the I/O performance, so it is possible to select the segment from disks having high collision values, then move the segment to disks having a lower collision value, to ease the stripe overlapping problem.

The control module may further obtain information associated with the number of unallocated segments included in the disk (namely, idle segments). It is easily appreciated that the number of idle segments reflects the distribution situation of segments on the disk as well as the available capability of the disk. Therefore, when the rebalance processing is performed for the segment, it is first necessary to consider selecting the segment from the disk having less idle segments, move the segment to the disk having more idle segments, thereby realizing the distribution rebalance of the segments on the plurality of disks.

At block 320, the number of stripes in each disk (namely, collision value) and the number of idle segments of each disk are considered and obtained, and such collision value is considered as distribution information used to determine (or identify) the source storage device and the destination storage device associated with the rebalance operation. Based on the distribution information, the disk (namely, source disk) where the segment for which the rebalance operation will be performed currently lies can be determined, as well as the disk (namely, the destination disk) to which the segment needs to be sent to perform the rebalance operation.

Figure 4:
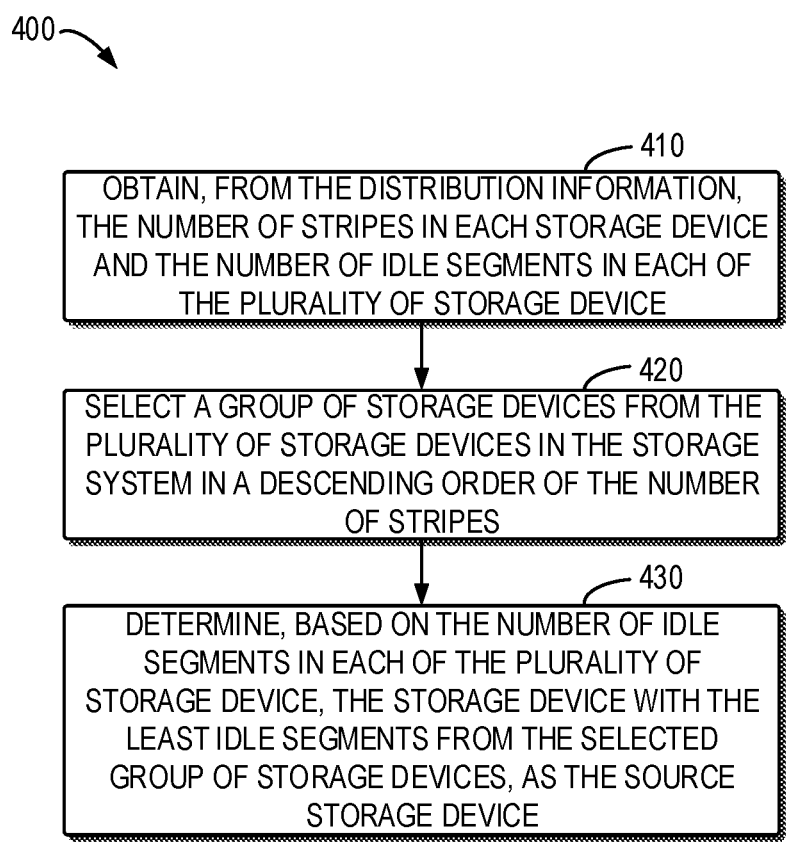
FIG. 4 illustrate a flow chart of a process of determining a source storage device according to an embodiment of the present disclosure.

FIG. 4 illustrate a flow chart of a process of determining a source storage device according to an embodiment of the present disclosure. At block 410 in FIG. 4, the number of stripes in each disk (namely, collision value) and the number of idle segments in each disk can be determined from the aforesaid distribution information. After the aforesaid distribution information is obtained, at block 420, all disks of RAID 112 are ranked in a descending order of the numbers of stripes, and a group of disks are selected therefrom, for example, the selected disks may be a predetermined number of disks ranking in the front. Additionally or affirmatively, the selected disks may be disks with number of stripes larger than a predetermined threshold. As easily appreciated, there can be various manners to select a group of disks with more quantity of stripes, from all disks in the RAID 112.

Then, at block 430, regarding the group of selected disks, another selection is further performed by considering the number of idle segments in the group of disks. It is easily appreciated that the disk with the least idle segments is usually the disk for which the rebalance needs to be performed most. Therefore, the disk with the least idle segments may be determined as the source disk for the rebalance operation. In an example, the source disk may be determined by ranking the group of disks according to the idle segments.

Figure 5:
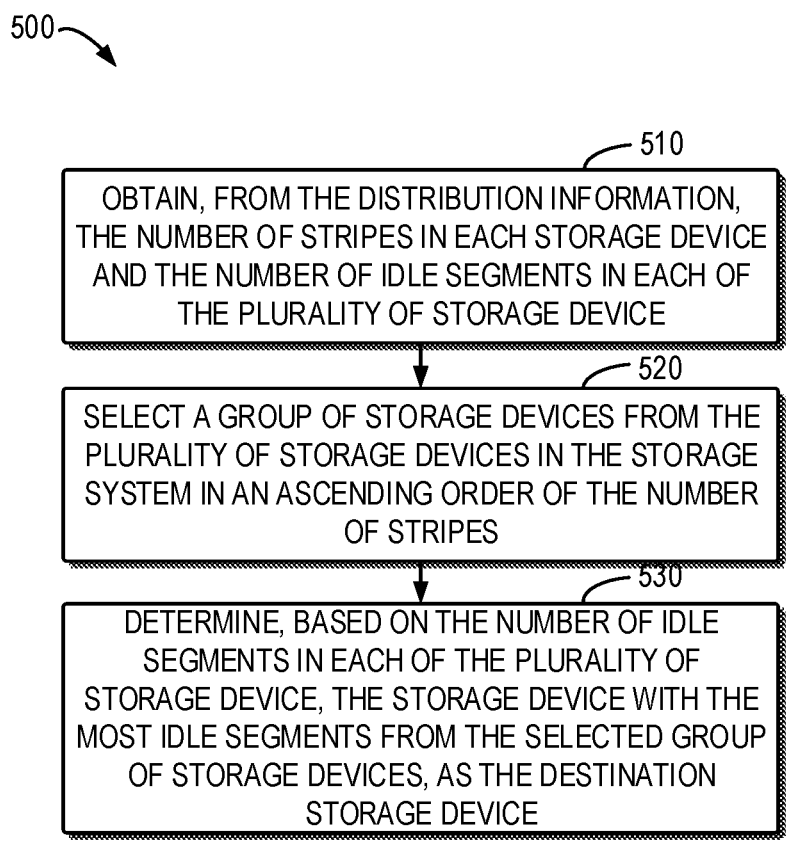
FIG. 5 illustrates a flow chart of a process of determining a destination storage device according to an embodiment of the present disclosure.

Additionally and alternatively, in some embodiments, the destination disk may be determined (or selected) in the following manner. The manner may be described with reference to FIG. 5. FIG. 5 illustrates a flow chart of a process of determining (or choosing) a destination storage device according to an embodiment of the present disclosure. At block 510 in FIG. 5, the number of stripes in each disk (namely, collision value) and the number of idle segments in each disk may be obtained from the aforesaid distribution information. After the aforesaid distribution information is obtained, at block 520, all disks of RAID 112 are ranked in an ascending order of the numbers of stripes, and a group of disks are selected therefrom, for example, the selected disks may be a predetermined number of disks ranking in the front. In addition, the selected disks may be disks with number of stripes larger than a predetermined threshold. As easily appreciated, there can be various manners to select a group of disks with a larger number of stripes, from all disks in the RAID 112.

Then, regarding the selected group of disks, another selection is further performed by considering the number of idle segments in the group of disks. It is easily appreciated that the disk with the most idle segments is usually a disk which is most suitable to receive the moved segment. Therefore, the disk with the most idle segments may be determined as the destination disk for the rebalance operation. In an example, the destination disk may be determined by ranking the group of disks according to the number of idle segments.

It is easily appreciated that the abovementioned process of determining the source disk and the destination disk may be performed separately, or simultaneously determined based on the obtained distribution information. This is not limited in the present disclosure.

Returning to FIG. 3, after the source disk associated with the rebalance operation is determined based on the distribution information, the process 300 proceeds to block 330.

At block 330, a target segment is determined from the source disk, based on the access information of the segments in the source storage device (namely, source disk). The access information of the segments is described beforehand. As stated above, in the working procedure of the RAID 112, the I/O access request from the external will be received constantly. The control module 130 in the storage management system 100 can monitor and record the I/O access requests for all segments of RAID 112 and accumulated over time. As easily appreciated, it is possible to obtain the number of I/O requests in any time period based on the recorded I/O requests which are accumulated over time. In an example, it is possible to obtain the number of I/O requests within a plurality of predetermined time periods or a unit time period based on the recorded I/O requests. That is, it is possible to obtain a frequency and/or number of accesses of the I/O accesses for each segment, to characterize (or describe) the access information of the segment. In another example, it is possible to, based on the recorded I/O request, obtain the number of I/O requests in each time period of n continuous time periods, and calculate the average number of I/O requests within the n time periods, as the I/O access heat for the segment. In a further example, a weighted average of the number of I/O requests within the n time periods may be calculated. The aforesaid average value or weighted average for each segment is then obtained, as the I/O access heat for the segment. As easily appreciated, the access information associated with the segment can be characterized (or identified) based on other statistics data associated with the I/O access quantity.

It may be easily appreciated that the source disk determined at the block 320 includes a plurality of allocated segments. In a conventional rebalance operation procedure, after the source disk is selected, the allocated segments therein are usually not distinguished, and one segment is directly selected therefrom and moved to the destination disk. Such operation can finally implement physically even distribution of all allocated segments across the plurality of disks, but as known from the foregoing description, since the I/O access information associated with the segment is not taken into consideration, the I/O access bottleneck problem cannot be effectively avoid from the RAID obtained after the rebalance operation.

For the above reasons, a target segment to be moved may be selected from the source disk by obtaining the access information associated with the allocated segments in the determined source disk. Specifically, in an embodiment, the target segment may be determined by obtaining a segment in the source disk having a larger number of access times. For example, the target segment is determined by simply obtaining a segment in the source disk having the largest number of access times. In a further embodiment, the target segment may be determined by considering the access times for the stripe where the segments in the source disk lie. Specifically, first obtain stripes respectively corresponding to each segments in the source disk, thereby obtaining the access times of each stripe. Subsequently, the stripe with the highest access times is selected, and the segment in the source disk corresponding to the stripe is determined as the target segment. It is easily appreciated that the access information for a stripe or disk may be determined based on the access information associated with a plurality of segments forming the certain stripe or disk.

In another embodiment, the target segment may be determined by simultaneously considering the segment with a larger access times as along with the access times of the stripe where the segment lies. For example, a group of segments with access times larger than a predetermined threshold may be selected. Subsequently, for the selected group of segments, further considering the stripe corresponding to each segment in these segments. For example, the target segment may be determined from the group of segments based on the access information of the respective stripe corresponding to each segment. In an example, it is possible to determine the I/O access heat value of the stripe corresponding to each segment, and select the segment corresponding to the stripe having the highest access heat value, as the target segment corresponding to the rebalance operation. In another example, the target segment may be selected based on the determined access frequency or access times of the respective stripe corresponding to each segment.

Figure 6:
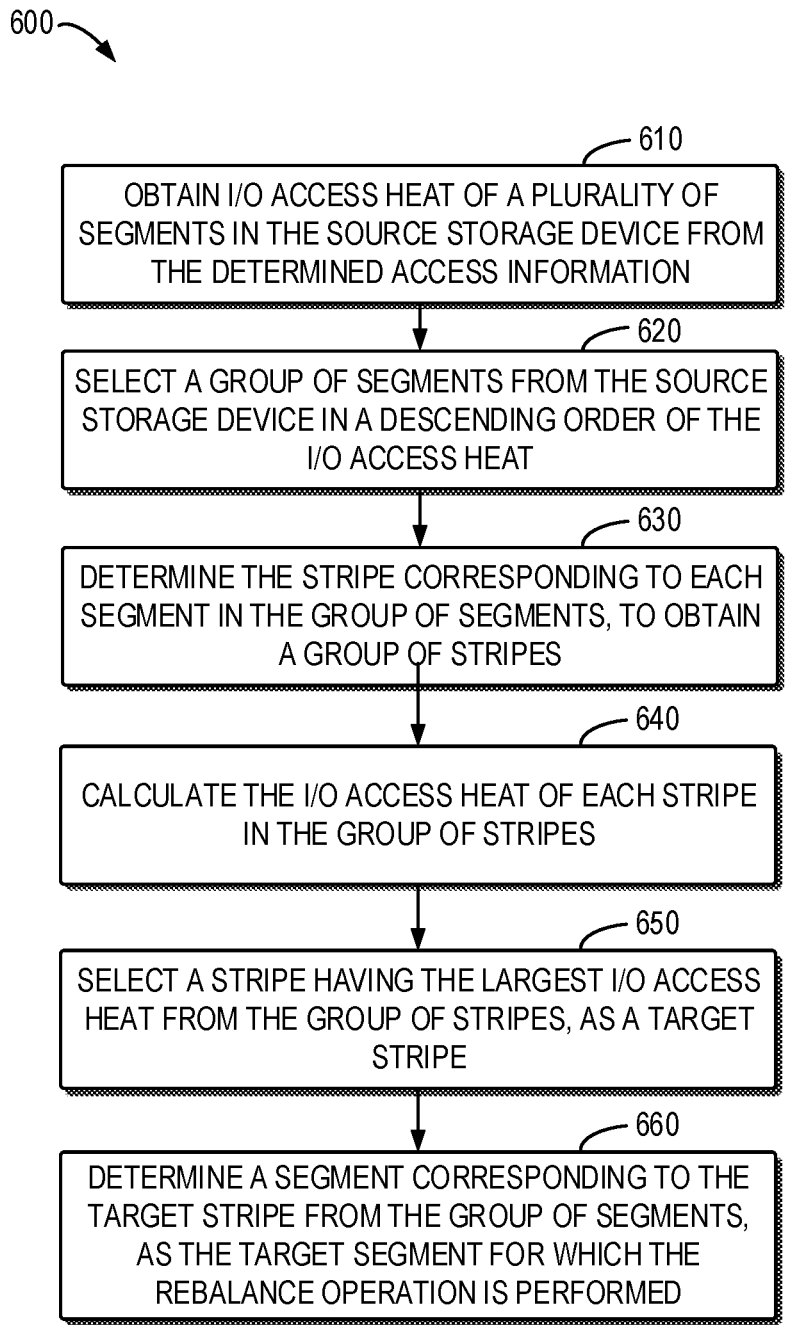
FIG. 6 illustrates a flow chart of a process of determining a target segment according to an embodiment of the present disclosure.

Hereunder, description will be presented to the embodiment in which the target segment is determined by determining the I/O access heat value. In this embodiment, the target segment is determined by simultaneously considering the segment in the source disk having a larger I/O access heat as well as the I/O access heat of the respective stripe where the segment lies. Reference is made to FIG. 6 to describe the present embodiment.

FIG. 6 illustrates a flow chart of a process of determining a target segment according to an embodiment of the present disclosure. At block 610, the I/O access heat of a plurality of segments in the source disk is obtained from the determined access information. The I/O access heat of each segment in the source disk may be obtained by the control module 130 in the aforesaid manner.

At block 620, a group of segments are selected from the source disk in a descending order of the I/O access heat. Each segment in the group of segments has a relatively higher access heat. Then, at block 630, regarding the selected group of segments, respective stripe corresponding to each segment in these segments is further considered. For example, it is possible to determine the stripe corresponding to each allocated segment in the group of segments, to obtain a group of stripes.

At block 640, the I/O access heat of each stripe in the group of stripes is calculated. The I/O access heat for a specific stripe may be determined by calculating a sum of I/O access heat of all segments included in the stripe. Then, at block 650, a stripe having the largest I/O access heat sum is selected from the group of stripes, as a target stripe. Finally, at block 660, a segment corresponding to the target stripe is selected from the determined group of segments, as the target segment for which the rebalance operation is performed.

According to the above embodiment, an target segment is determined by simultaneously considering the segment with a larger I/O access heat in the source disk and the I/O access heat of the stripe including the segment, it is possible to determine the segment which currently needs rebalance most and should be moved to the destination disk more effectively, thereby performing the rebalance operation and optimizing the overall performance of the storage system more efficiently.

Returning to FIG. 3, after determining the to-be-moved target segment from the source storage device based on the access information of the segment in the source storage device, the process 300 proceeds to block 340.

At block 340, the control module 130 moves the to-be-moved target segment from the previously-determined source storage device to the destination storage device. The target segment may be moved to any idle segment in the destination storage device. As such, the rebalance operation for a single specific segment is completed. It should be appreciated that subsequently the control module continues to determine whether all segments in the current RAID have already been evenly distributed, and in the case of determining that the distribution does not achieve balance, continues to perform the rebalance operation for another segment, until the control module determines that the distribution of segments on current disks has already reached a balanced state.

It can be seen that in embodiments of the present disclosure, the distribution information and access information associated with RAID are taken into consideration when the rebalance operation is performed for a segment. Specifically, the distribution information and access information associated with segments, stripes and disks in the RAID are taken into consideration. By considering the distribution information and access information when the rebalance operation is performed for a segment, the overlapping problem can be overcome as much as possible when the rebalance operation is performed for segments, and segments with a high access times can be distributed on different disks, thereby effectively avoiding the I/O bottleneck and implementing more flexible and more efficient dynamic management for the RAID while performing balance operation for segments in the RAID.

Figure 7:
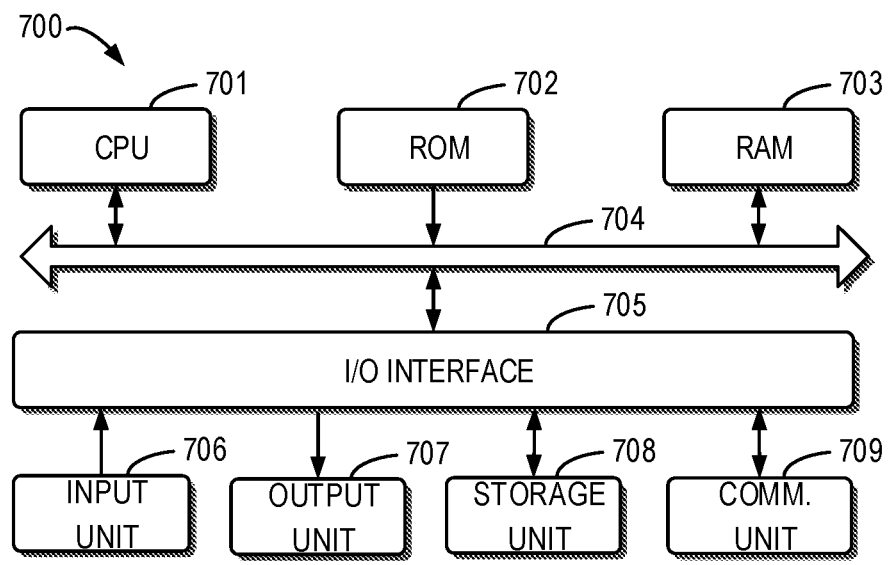
FIG. 7 illustrates a block diagram of an example device adapted to implement an embodiment of the present disclosure.

FIG. 7 illustrates a block diagram of an example device 700 suitable to implement an embodiment of the present disclosure. The device 700 may be used to implement the control module 130 or part of the control module 130 in FIG. 1 and FIG. 2. As shown in the figure, the device 700 includes a central processing unit (CPU) 701 which is capable of performing various processes in accordance with computer program instructions stored in a read only memory (ROM) 702 or computer program instructions loaded from a storage unit 708 to a random access memory (RAM) 703. In the RAM 703 are stored various programs and data as required by operation of the apparatus 700. The CPU 701, the ROM 702 and the RAM 703 are connected to one another via a bus 704. An input/output (I/O) interface 707 is also connected to the bus 704.

The following components in the device 700 are connected to the I/O interface 705: an input unit 706 including a keyboard, a mouse, or the like; an output unit 707 such as various types of displays and speakers; the storage unit 708 such as a magnetic disk or optical disk; and a communication unit 709 such as a network card, a modem, a wireless communication transceiver or the like. The communication unit 709 allows the device 700 to exchange information/data with other devices via a computer network such as the Internet and/or various telecommunication networks.

The processing unit 701 performs various method and processes described above, for example methods 200 and/or 500. For example, in some embodiments, the method 200 or 500 may be implemented as a computer software program or computer program product, which is tangibly contained in a machine-readable medium, for example the storage unit 708. In some embodiments, part or all of the computer program may be loaded and/or installed on the device 700 via ROM 702 and/or communication unit 709. When the computer program is loaded in the RAM 703 and executed by CPU 701, one or more steps of the method 200 and/or 500 described above may be executed. Alternatively, in other embodiments, the CPU 701 may be configured to execute methods 200 and/or 500 in any other proper manners (e.g., by virtue of a firmware).

Those skilled in the art should appreciate that the above steps of the method of the present disclosure may be implemented by using a general-purpose computing device, and they may be integrated on a single computing device, or distributed on a network including a plurality of computing devices. Optionally, they may be implemented by using computing device-executable program codes so that they may be stored in a storage device and executed by the computing device, or they are respectively fabricated into respective integrated circuit modules, or multiple modules or steps therein are implemented in a way of being fabricated into a single integrated circuit module. As such, the present disclosure is not limited to any specific combination of hardware and software.

It should be appreciated that although a plurality of means or sub-means of the apparatus have been mentioned in the above detailed depiction, such partitioning is merely by way of example and non-compulsory. In actuality, according to the embodiments of the present disclosure, the features and functions of the above described two or more means may be embodied in one means. In turn, the features and functions of the above described one means may be further embodied by more means.

What are described above are only preferred embodiments of the present disclosure and not intended to limit the present disclosure. Those skilled in the art appreciate that the present disclosure may have diverse modifications and variations. Any modifications, equivalent substitutions and improvements made within the spirit and principle of the present disclosure all fall within the protection scope of the present disclosure.

We claim:

1. A method of managing a storage system, comprising:
   in response to determining that a rebalance operation is to be performed, determining a source storage device and a destination storage device associated with the rebalance operation based on distribution information of segments included in stripes of the storage system across a plurality of storage devices in the storage system;
   determining a target segment from the source storage device based on access information of segments in the source storage device; and
   moving the target segment to the destination storage device;
   wherein the determining the source storage device and the destination storage device comprises:
   obtaining, from the distribution information, a number of stripes using each storage device and a number of idle segments in each of the plurality of storage device;
   selecting a group of storage devices from the plurality of storage devices in the storage system in a particular order of the numbers of stripes; and
   at least one of: determining, based on the number of idle segments in each of the plurality of storage devices, (i) a storage device with fewest idle segments from the selected group of storage devices as the source storage device and (ii) a storage device with most idle segments from the selected group of storage devices as the destination storage device.

2. The method according to claim 1, further comprising:
   obtaining a number of stripes in each storage device and a number of idle segments in each storage device, as at least a portion of the distribution information.

3. The method according to claim 1, further comprising:
   obtaining, as at least a portion of the access information, at least one of the following: input/output (I/O) access heat, access frequency and number of accesses.

4. The method according to claim 1, wherein the particular order is a descending order; and
   wherein the determining the source storage device and the destination storage device comprises:
   determining, based on the number of idle segments in each of the plurality of storage device, the storage device with the fewest idle segments from the selected group of storage devices as the source storage device.

5. The method according to claim 1, wherein the particular order is an ascending order; and
   wherein the determining the source storage device and the destination storage device comprises:
   determining, based on the number of idle segments in each of the plurality of storage device, the storage device with the most idle segments from the selected group of storage devices as the destination storage device.

6. The method according to claim 1, wherein the determining the target segment from the source storage device comprises:
   selecting, based on the access information, a segment with a largest number of access times from the source storage device as the target segment, or selecting, from the source storage device, a segment corresponding to a stripe with a largest number of access times in respective stripes corresponding to respective segments in the source storage device as the target segment.

7. The method according to claim 1, wherein determining the target segment from the source storage device comprises:
   selecting, based on the access information and from the source storage device, a group of segments with a number of access times larger than a predetermined threshold; and
   determining the target segment from the group of segments based on access information corresponding to the stripe corresponding to each segment in the group of segments.

8. The method according to claim 1, wherein determining the target segment from the source storage device comprises:
   obtaining input/output (I/O) access heat of the segments in the source storage device from the access information;
   selecting a group of segments from the source storage device in a descending order of the I/O access heat; and
   determining the stripe corresponding to each segment in the group of segments to obtain a group of stripes;
   determining a sum of the I/O access heat of all segments included in each stripe in the group of stripes;
   selecting a stripe having a largest I/O access heat from the group of stripes as a target stripe;
   determining a segment corresponding to the target stripe from the group of segments, as the target segment.

9. An apparatus for managing a storage system, comprising:
   a set of processors; and
   a memory coupled to the set of processors, and storing computer program instructions which, when executed by the set of processors, cause the apparatus to perform acts of managing a plurality of storage devices, the acts comprising:
   in response to determining that a rebalance operation is to be performed, determining a source storage device and a destination storage device associated with the rebalance operation based on distribution information of segments included in stripes of the storage system across a plurality of storage devices in the storage system,
   determining a target segment from the source storage device based on access information of segments in the source storage device, and
   moving the target segment to the destination storage device;
   wherein the determining the source storage device and the destination storage device comprises:
   obtaining, from the distribution information, a number of stripes using each storage device and a number of idle segments in each of the plurality of storage device,
   selecting a group of storage devices from the plurality of storage devices in the storage system in a particular order of the number of stripes, and
   at least one of: determining, based on the number of idle segments in each of the plurality of storage device, (i) a storage device with fewest idle segments from the selected group of storage devices, as the source storage device, and (ii) a storage device with most idle segments from the selected group of storage devices, as the destination storage device.

10. The apparatus according to claim 9, wherein the acts further comprise:
    obtaining a number of stripes in each storage device and a number of idle segments in each storage device, as the distribution information.

11. The apparatus according to claim 9, wherein the acts further comprise:
    obtaining, as at least a portion of the access information, at least one of the following input/output (I/O) access heat, access frequency and number of accesses.

12. The apparatus according to claim 9, wherein the particular order is a descending order; and
    wherein the determining the source storage device and the destination storage device comprises:
    determining, based on the number of idle segments in each of the plurality of storage device, the storage device with the fewest idle segments from the selected group of storage devices, as the source storage device.

13. The apparatus according to claim 9, wherein the particular order is an ascending order; and
    wherein the determining the source storage device and the destination storage device comprises:
    determining, based on the number of idle segments in each of the plurality of storage device, the storage device with the most idle segments from the selected group of storage devices, as the destination storage device.

14. The apparatus according to claim 9, wherein the determining the target segment from the source storage device comprises:
    based on the access information, selecting a segment with a largest number of access times from the source storage device as the target segment, or selecting, from the source storage device, a segment corresponding to a stripe with a largest number of access times in respective stripes corresponding to respective segments in the source storage device, as the target segment.

15. The apparatus according to claim 9, wherein the determining the target segment from the source storage device comprises:
    based on the access information, selecting from the source storage device a group of segments with a number of access time larger than a predetermined threshold; and
    determining the target segment from the group of segments based on access information corresponding to the stripe corresponding to each segment in the group of segments.

16. The apparatus according to claim 9, wherein determining the target segment from the source storage device comprises:
    obtaining input/output (I/O) access heat of the segments in the source storage device from the access information;
    selecting a group of segments from the source storage device in a descending order of the I/O access heat; and
    determining the stripe corresponding to each segment in the group of segments, to obtain a group of stripes;
    determining a sum of the I/O access heat of all segments included in each stripe in the group of stripes;

selecting a stripe having a largest I/O access heat from the group of stripes, as a target stripe;

determining a segment corresponding to the target stripe from the group of segments, as the target segment.

17. A computer program product having a non-transitory computer readable medium which stores a set of instructions for managing a storage system; the set of instructions, when carried out by computerized circuitry, causing the computerized circuitry to perform a method of:

in response to determining that a rebalance operation is to be performed, determining a source storage device and a destination storage device associated with the rebalance operation based on distribution information of segments included in stripes of the storage system across a plurality of storage devices in the storage system;

determining a target segment from the source storage device based on access information of segments in the source storage device; and moving the target segment to the destination storage device;

wherein the determining the source storage device and the destination storage device comprises:

obtaining, from the distribution information, a number of stripes using each storage device and a number of idle segments in each of the plurality of storage device;

selecting a group of storage devices from the plurality of storage devices in the storage system in a particular order of the numbers of stripes; and at least one of: determining, based on the number of idle segments in each of the plurality of storage devices, (i) a storage device with fewest idle segments from the selected group of storage devices as the source storage device and (ii) a storage device with most idle segments from the selected group of storage devices as the destination storage device.

18. The computer program product according to claim 17, wherein the particular order is a descending order; and wherein the determining the source storage device and the destination storage device comprises:

determining, based on the number of idle segments in each of the plurality of storage device, the storage device with the fewest idle segments from the selected group of storage devices as the source storage device.

19. The computer program product according to claim 17, wherein the particular order is an ascending order; and wherein the determining the source storage device and the destination storage device comprises:

determining, based on the number of idle segments in each of the plurality of storage device, the storage device with the most idle segments from the selected group of storage devices as the destination storage device.

20. A method of managing a storage system, comprising:

in response to determining that a rebalance operation is to be performed, determining a source storage device and a destination storage device associated with the rebalance operation based on distribution information of segments included in stripes of the storage system across a plurality of storage devices in the storage system;

determining a target segment from the source storage device based on access information of segments in the source storage device; and moving the target segment to the destination storage device;

wherein determining the target segment from the source storage device comprises:

selecting, based on the access information and from the source storage device, a group of segments with a number of access times larger than a predetermined threshold; and determining the target segment from the group of segments based on access information corresponding to the stripe corresponding to each segment in the group of segments.

* * * * *